United States Patent
Barillaud et al.

(10) Patent No.: US 9,992,195 B2
(45) Date of Patent: *Jun. 5, 2018

(54) NETWORK AUTHENTICATION OF A GEO-FENCED VOLUME

(71) Applicant: International Business Machines Corporation, Armonk, NY (US)

(72) Inventors: Franck Barillaud, Austin, TX (US); Insoo Cho, Pittsburgh, PA (US); Daniel M. Christiani, East Falmouth, MA (US); Mark R. Thill, Seattle, WA (US); David S. Zhang, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/839,895

(22) Filed: Dec. 13, 2017

(65) Prior Publication Data
US 2018/0103035 A1    Apr. 12, 2018

Related U.S. Application Data

(63) Continuation of application No. 14/707,180, filed on May 8, 2015, now Pat. No. 9,866,552.

(51) Int. Cl.
*G06F 7/04* (2006.01)
*G06F 15/16* (2006.01)
(Continued)

(52) U.S. Cl.
CPC .......... *H04L 63/0861* (2013.01); *H04L 41/00* (2013.01); *H04W 4/001* (2013.01);
(Continued)

(58) Field of Classification Search
CPC .... H04L 63/0861; H04W 4/00; H04W 4/001; H04W 4/021
(Continued)

(56) References Cited

U.S. PATENT DOCUMENTS 6,345,043 B1   2/2002  Hsu
7,539,862 B2 * 5/2009  Edgett ............... H04L 63/08
                                                       709/223

(Continued)

FOREIGN PATENT DOCUMENTS

WO   2009152262 A1   12/2009
WO   2013185166 A1   12/2013
(Continued)

OTHER PUBLICATIONS

Ragavan et al., "A Decentralised Software Process Approach for Real time Navigation of Service Robots," Mobile Robots Navigation, pp. 289-307, Mar. 2010, Alejandra Barrera (Ed.), ISBN 978-953-307-076-6, Publisher: InTech.

(Continued)

*Primary Examiner* — Dant B Shaifer Harriman
(74) *Attorney, Agent, or Firm* — Nicholas D. Bowman

(57) ABSTRACT

Provided is a method for managing a software defined network using a software control layer to regulate a geo-fenced volume. The software control layer can use a Global Positioning System (GPS) including a range of latitudes, a range of longitudes and a range of altitudes. A resource within the geo-fenced volume can be assigned a location using the GPS coordinates. The resource can be managed by external applications that are operating through the software control layer. To determine an access of a device to the geo-fenced volume, the GPS coordinates, are gathered as a geographical location of the device. A user profile can be accessed to determine an access path of the user. Depending on the geographical location of the device a first condition can be generated based on the device being within the geo-fenced volume. A network permission can be granted to the device based on the first condition.

9 Claims, 11 Drawing Sheets

(51) Int. Cl.

| | |
| --- | --- |
| *G06F 17/30* | (2006.01) |
| *H04L 29/06* | (2006.01) |
| *H04L 12/24* | (2006.01) |
| *H04W 4/00* | (2018.01) |
| *H04W 4/02* | (2018.01) |
| *H04W 12/08* | (2009.01) |
| *H04L 29/08* | (2006.01) |
| *H04W 12/06* | (2009.01) |

(52) U.S. Cl.
CPC ........... *H04W 4/021* (2013.01); *H04W 12/08* (2013.01); *H04L 63/107* (2013.01); *H04L 67/306* (2013.01); *H04W 12/06* (2013.01)

(58) Field of Classification Search
USPC .......................................................... 726/4
See application file for complete search history.

(56) References Cited

U.S. PATENT DOCUMENTS

| | | | |
| --- | --- | --- | --- |
| 7,606,938 B2 * | 10/2009 | Roese .................. | G01S 5/02 455/456.1 |
| 7,706,369 B2 | 4/2010 | Roese et al. | |
| 7,739,724 B2 | 6/2010 | Durham et al. | |
| 8,471,701 B2 * | 6/2013 | Yariv ................... | H04W 4/021 340/539.13 |
| 8,566,961 B2 * | 10/2013 | Lemieux ................ | G06F 21/57 701/300 |
| 9,866,552 B2 * | 1/2018 | Barillaud ............ | H04L 63/0861 |
| 2005/0071671 A1 * | 3/2005 | Karaoguz ............ | G06Q 20/085 726/26 |
| 2006/0187858 A1 * | 8/2006 | Kenichi .............. | H04L 12/5692 370/254 |
| 2010/0240399 A1 * | 9/2010 | Roumeliotis ...... | G06Q 30/0261 455/456.3 |
| 2012/0303828 A1 | 11/2012 | Young et al. | |
| 2013/0198266 A1 | 8/2013 | Kiley et al. | |
| 2014/0020102 A1 | 1/2014 | Srinivasan et al. | |
| 2014/0085084 A1 * | 3/2014 | Ghazarian ............ | H04W 4/023 340/539.13 |
| 2014/0189804 A1 * | 7/2014 | Lehmann .............. | H04L 63/105 726/4 |
| 2016/0066142 A1 * | 3/2016 | Barillaud ............. | H04W 48/04 455/456.1 |
| 2016/0203370 A1 * | 7/2016 | Child .................. | G06K 9/00771 348/143 |
| 2016/0330626 A1 * | 11/2016 | Barillaud ............ | H04L 63/0861 |

FOREIGN PATENT DOCUMENTS

| | | |
| --- | --- | --- |
| WO | 2013186712 A1 | 12/2013 |
| WO | 2014020379 A1 | 2/2014 |

OTHER PUBLICATIONS

Reclus et al., "Geofencing for Fleet & Freight Management," 2009 9th International Conference on Intelligent Transport Systems Telecommunications (ITST), Oct. 20-22, 2009, pp. 353-356 DOI: 10.1109/ITST.2009.5399328.

Rothenberg et al., "Revisiting Routing Control Platforms with the Eyes and Muscles of Software-Defined Networking", Proceedings of the first workshop on Hot topics in software defined networks (HotSDN'12), Aug. 13, 2012, pp. 13-18, Copyright 2012 ACM DOI: 10.1145/2342441.2342445.

Rouse, M., "SDN controller (software-defined networking controller);" copyright 2011-2014, TechTarget, pp. 1-4, http://searchsdn.techtarget.com/definition/SDN-controller-software-defined-networking-controller.

Sheth et al., "Geo-fencing: Confining Wi-Fi Coverage to Physical Boundaries," Proceedings of the 7th International conference on Pervasive Computing, LNCS 5538, pp. 274-290, Copyright Springer-Verlag Berlin Heidelberg 2009 DOI: 10.1007/978-3-642-01516-8_19.

Unknown, "Technical Overview," Open Daylight, Copyright 2014 OpenDaylight, A Linux Foundation Collaborative Project, pp. 1-3 http://www.opendaylight.org/project/technical-overview.

Voellmy et al., "Scalable Software Defined Network Controllers," ACM SIGCOMM Computer Communication Review—Special October Issue, Oct. 2012, vol. 42, Issue 4, pp. 289-290, (SIGCOMM'12, Aug. 2012) DOI: 10.1145/2377677.2377735.

Ali-Ahmad et al., "CROWD: An SDN Approach for DenseNets," 2013 Second European Workshop on Software Defined Networks, Oct. 10-11, 2013, pp. 25-31 DOI: 10.1109/EWSDN.2013.11.

Enghardt, T., "Authentication, Authorization and Mobility in Openflow-enabled Enterprise Wireless Networks," Master Project Report, WS 11/12 (Version from Sep. 11, 2012), 51 pages.

Mell et al., "The NIST Definition of Cloud Computing", Recommendations of the National Institute of Standards and Technology, Special Publication 800-145, Sep. 2011, pp. 1-7, National Institute of Standards and Technology, Gaithersburg, MD.

Sadoun et al., "Location based services using geographical information systems", Computer Communications, vol. 30, Issue 16, Nov. 3, 2007, pp. 3154-3160, © 2007 Elsevier B.V. DOI: 10.1016/j.comcom.2007.05.059.

Barillaud et al., "Wireless Service Provider Management of Geo-Fenced Spaces", U.S. Appl No. 14/472,460, filed Aug. 29, 2014.

Barillaud et al., "Wireless Service Provider Management of Geo-Fenced Spaces", U.S. Appl No. 14/512,518, filed Oct. 13, 2014.

Barillaud et al., "Network Authentication of a Geo-Fenced Volume," U.S. Appl No. 14/707,180, filed May 8, 2016.

Barillaud et al., "Network Authentication of a Geo-Fenced Volume," U.S. Appl No. 15/055,070, filed Feb. 26, 2016.

Barillaud et al., "Network Authentication of a Geo-Fenced Volume," U.S. Appl No. 15/839,920, filed Dec. 13, 2017.

List of IBM Patents or Patent Applications Treated as Related, dated Dec. 11, 2017, 2 pages.

* cited by examiner

NETWORK AUTHENTICATION OF A GEO-FENCED VOLUME

BACKGROUND

The present disclosure relates to network security, more particular aspects relate to granting or limiting access to a network depending on a device and the geographic location of the device.

Location based software is currently quickly emerging on the internet, most search engines already used geographical information to tailor search results to the user. If a device is used to search for nearby shopping centers, or current weather information results, can be generated. These information results can include the closest shopping centers, or relevant weather information, relative to the geographical location of the device. The information results can use hypertext transformation protocol (HTTP) geographical headers generated by the device which are communicated to a server when accessing a website, or a database.

SUMMARY

According to embodiments of the present disclosure, a proposed method to enhance the security of a software defined network that manages an access of a device based on the geographical location of the device.

One embodiment provides a method for managing a software defined network with a software control layer within a software defined network controller. A first geo-fenced volume of the software defined network is defined and managed by the software control layer. The geo-fenced volume is defined by using a coordinate system that can include a range of latitudes, a range of longitudes, and a range of altitudes. The software control layer uses Global Positioning Systems (GPS) to generate data, or information based on the coordinate system which defined by the first geo-fenced volume. One or more resources within the first geo-fenced volume are assigned a location using GPS coordinates that can include a latitude, a longitude, and an altitude. The one or more resources can be managed by external applications that are operating upon the software defined network. To determine an access of a device to the software defined network the GPS coordinates that can include a latitude, a longitude, and an altitude of the device are gathered as a geographical location of the device. A user profile can be gathered to determine an access path of the user. Depending on the geographical location of the device a first condition can be generated based on the device being within the first geo-fenced volume of the software defined network. One or more network permissions can be granted to the device based on the first condition.

Another embodiment provides a system for managing a software defined network. The system can be operated upon a computing device that includes at least, a memory, a processor device, and a software defined network controller. The memory and the processor device, are communicatively coupled with the software defined network controller. The software defined network controller includes a software control layer which includes a logical geo-fencing component, and a dynamic network reconfiguration and management component. The logical geofencing component defines a first geo-fenced volume of the software defined network using a GPS that can include a range of latitudes, a range of longitudes, and a range of altitudes. The GPS including a range of altitudes, uses a coordinate system to determine the geographical location of a device using a latitude, a longitude, and an altitude. The logical geofencing component can also assign GPS coordinates that can include a latitude, a longitude, and an altitude to the resources within the first geo-fenced volume. The logical geo-fencing component can allow external applications to manage the one or more resources within the first geo-fenced volume. After defining the first geo-fenced volume the dynamic reconfiguration and management component can determine the access of the device. The dynamic reconfiguration and management component accesses a user profile of the device and uses the user profile to reconfigure one or more network permissions, based on the user profile. Depending on the geographical location of the device a first condition can be generated, based on a geographical location of the device being within the first geo-fenced volume of the software defined network. One or more network permissions can be granted to the device based on the first condition.

Another embodiment, provides a computer program product for managing the software defined network that includes a computer storage device having program instructions. The program instructions can cause the computing device to define a first geo-fenced volume of a software defined network, and an access path of a device. The first geo-fenced volume of the software defined network is defined with GPS coordinates. The GPS coordinates can include a range of latitudes, a range of longitudes, and a range of altitudes of the first geo-fenced volume. The GPS coordinate system generates data that can be accessed by the computer program product. One or more resources within the first geo-fenced volume are assigned GPS coordinates that include a latitude, a longitude, and an altitude. The one or more resources can be managed by more or more external applications, applied through the computer program product. The geographical location of the device is determined by the GPS coordinates including a latitude, a longitude, and an altitude of the device. The geographical location of the device can be used to determine the access of the device to the first geo-fenced volume. A user profile can be accessed to determine one or more network permissions, and reconfigure the one or more network permissions based on the user profile of the device. A first condition can be determined based on the geographic location of the device being within the first geo-fenced volume. The device can be granted one or more network permissions based the determination of the first condition.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
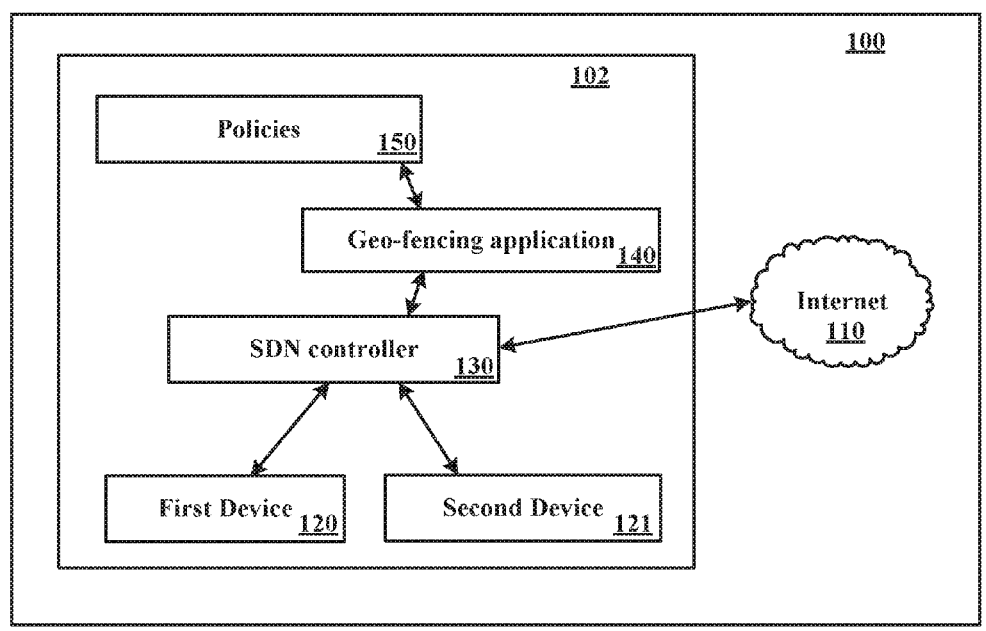
FIG. 1 illustrates a geo-fenced volume of a network where devices are located within the geo-fenced volume and are attempting to connect to the network, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to network security, more particular aspects relate to granting or limiting access to a network depending on a device and the geographic location of the device. A software defined network (SDN) can be managed by a SDN controller to determine an access of a device based on the geographical location of the device. The SDN controller can be an access point (AP) or wireless access point (WAP) the device can connect to depending on the configuration of the device. The WAP can allow the device to connect wirelessly to the SDN to gain access to the resources of the network. The WAP can be communicatively coupled with the SDN controller to apply the policies which are capabilities or constraints of the SDN. The SDN controller can be implemented to define a geo-fenced volume of a network, and determine if a geographical location of the device is within the geo-fenced volume. The geo-fenced volume can be defined by data gathered from a Global Position System (GPS). The GPS data of the geo-fenced volume can include a range of latitudes, a range of longitudes, and a range of altitudes. If the device is within the geo-fenced volume, or within the range of latitudes, the range of longitudes, and the range of altitudes the device can be granted access to the geo-fenced volume. While the present disclosure is not necessarily limited to such applications, various aspects of the disclosure can be appreciated through a discussion of various examples using this context.

Software defined networking (SDN) is an emerging technology which can allow for the control of a network to become directly programmable, centrally manageable, and allow for on-the-fly service injection. When a data stream is being accessed, location-based software of a software defined network can be used to gather geographical information on the system accessing the data stream to determine the networks security level.

Location-aware applications or location-based services can be used to provide services to a user based on a geographical location of the user, and what the user is searching for. For example the location-aware application can determine the location of the user with GPS. If the user was to search for the weather forecast without specifying the location they are in, the location-aware application may output the weather information for the geographical location of the user.

On-the-fly network injections can be security alterations used to increase the security of the network. Examples of on-the-fly network injections can include firewalls, or data encryption. If a user is attempting to access the network with proper security credentials, but is not in a secure location the data being accessed on the network can be encrypted. The encryption may be implemented to prevent users that do not have security credentials from intercepting the data being transferred. If a user is within a geographical location of a workplace, data encryption can be unnecessary because of the users within the geographical location are trusted users.

A geo-fenced volume can be defined as a logical abstraction mapped to geographical coordinates, the geo-fenced volume can be simple or complex. The geo-fenced volume can be mapped as a geographical location or geographical coordinates within a larger volume, and the geo-fenced volume can include a range of altitudes. The larger volume can be defined by a coordinate system that includes a range of altitudes. The configuration of the geo-fenced volumes can be a simple shape or a complex structure depending on the network. An example of simple shapes of a geo-fenced volume could include a rectangular geo-fenced volume of an office. An example of a complex structure of a geo-fenced volume could include an irregular structure with multiple levels within a larger volume. The geo-fenced volumes can be mapped out to upon a coordinate system that can include of a single building of a location, or a complex of buildings each with a separate security levels. The geo-fenced volume can be defined within two-dimensions specified by a range of latitudes, and a range of longitudes. The geo-fenced volume can also be defined within three-dimensions specified by a range of latitudes, a range of longitudes, and a range of altitudes. An altitude can be defined as the height or distance measurement a device is above or below a determined zero height. Examples of determined zero heights can include the distance the device is above or below the ground level, or above or below sea level. The measurement of the altitude can be related to sea level to determine if an altitude of a device is within a range of altitudes determined by the geo-fenced volume. The geo-fenced volume can be any size within a coordinate system determined by a range of the latitudes and the longitudes. Examples of sizes of geo-fenced volumes can include a small single office, a building, a region, or a large continent. According to various embodiments, example ranges of the size of the geo-fenced volume can be measured down to the centimeter or smaller. The GPS can be used to determine the geographical location of the user. In various embodiments, the geographical location can be measured down to one or two meters.

The geo-fenced volume can also be communicatively coupled with external applications or higher level components using a northbound application program interface (API). The northbound API can allow external applications to manage the resources or lifecycle of the geo-fenced volume. Examples of functionalities of external applications the northbound API can implement can include receiving a resource lists, applying policies to resources, removing resources from the resource list, or quarantining resources from the resource list. The functionalities of the external applications can be implemented on-the-fly, based on the device attempting to access the geo-fenced volume. In various embodiments, the on-the-fly implemented external applications can be used to reconfigure an access path of a user depending upon the geographical location of the user relative to the geo-fenced volume. A logical geofencing component can be implemented as an external component of the northbound API upon a software defined network (SDN) controller to define the geo-fenced volume and configure the geo-fenced volume to the needs of the SDN.

In various embodiments, northbound application program interfaces (API) can be implemented to control a software defined network (SDN) using applications which are simple to manage. Northbound API increase the management simplicity by using an application to adjust a framework of the SDN. Instead of having a network administrator tweak the framework repeatedly, an updatable application can be implemented. Northbound API can also increase the security of the SDN by managing the network traffic of the SDN, or including applications to monitor network intrusions upon the SDN. For example, the northbound API can implement a service injection upon a determination of a network intrusion.

In various embodiments, each resource within the SDN can be assigned GPS coordinates made available to external applications. The GPS coordinates of the resource can include a latitude, a longitude, and an altitude. The external applications can be made available to the northbound API through the SDN controller. The external applications can use the GPS coordinates to manage the resources. Examples of managing the external applications include management information base (MIB), or simple network management protocol (SNMP), to configure and retrieve information. MIB is a database that is used to manage entities within a communication network, and SNMP can be implemented to manage devices on Internet protocol (IP) networks.

The SDN can include certain policies that pertain to the definition of the geo-fenced volume. The policies can determine certain permissions of a device based on the geo-fenced volume. Example permissions of the device can include characteristics, capabilities, or constraints upon the device. The permissions of the geo-fenced volume can depend on if the device is within or outside the defined geo-fenced volume. When the device is attempting to access a network of the geo-fenced volume, the policies of the geo-fenced volume can be applied to the access of the device depending on the location of the device.

In various embodiments, if the device is inside the geo-fenced volume the policies which are capabilities or constraints of the geo-fenced volume can be applied. An example capability or constraint that can be applied upon the device inside the geo-fenced volume can include resource access. If the device is outside the geo-fenced volume the policies of the geo-fenced volume can be applied based on the device being outside the geo-fenced volume. For example if the device is a mobile device and located outside of the geo-fenced volume, a geo-fencing application can determine that the device is not located inside the geo-fenced volume, and apply the policies that can either limit the abilities of the device on the network, or restrict the device to access the network. Example capabilities or constraints that can be applied upon the device outside the geo-fenced volume can include encryption or deep packet inspection.

In various embodiments, if a device is attempting to access a geo-fenced volume of a software defined network and the device located outside the geo-fenced volume, an access path can be implemented. The access path can be used to determine a connection of the device to the geo-fenced volume. Depending on a configuration of the geo-fenced volume the access path can determine if the configuration allows the device can connect remotely to the geo-fenced volume. For example if the configuration of the network does not allow remote access, the device may be required to be within the geo-fenced volume to connect to the network. If the device was denied access to connect remotely to the geo-fenced volume, but moves to a geographical location within the geo-fenced volume, the access path can be reconfigured to allow the device access to the network. For example, if the device is able to connect wirelessly to the software defined network and trying to access a wireless connection to a coffee shop. If the device is outside an entrance to the coffee shop, they may be able to connect to the network of the coffee shop, but the device may not be granted access to resources of the geo-fenced volume. An example of a resource of the geo-fenced volume can include an internet connection. The device can then enter the geo-fenced volume of the coffee shop where the access path is reconfigured to grant access to the device.

The access path can also be implemented for a device having a beginning geographical location inside the geo-fenced volume of the software defined network and leaving the geo-fenced volume. For example if a user is taking their device home from work. If the user changes their geographical location of the device from within the geo-fenced volume of the network to being outside the geo-fenced volume of the network. The access path can determine the geographical location of the device being outside the geo-fenced volume. The device leaves the geo-fenced volume of the software defined network, and attempts to connect to the network they can be denied access based on their geographical location not being inside the geo-fenced volume.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In FIG. 1 a secure network controller applies policies of a geo-fenced volume onto devices within the geo-fenced volume. A geo-fenced volume 102 of a network is defined and is situated within a larger volume 100. Policies 150 of the geo-fenced volume 102 are applied to the geo-fenced volume 102 to determine permissions on devices within the geo-fenced volume 102. The devices are connected to a software defined network (SDN) controller 130. The SDN controller 130 is connected to the network, and the network can include the internet 110, a geo-fencing application 140, a first device 120, and a second device 121.

In various embodiments, the SDN controller 130 can consolidate resources of the geo-fenced volume 102 into a resource list of the geo-fenced volume 102. The SDN controller 130 can apply the resources to the devices of the geo-fenced volume 102. Examples of resources included on the resource list can include the policies 150 of the geo-fenced volume, network drives, network servers, or the internet 110. In embodiments, a geographical location of the first device 120, and a geographical location of the second device 121 are both located within the geo-fenced volume 102. In this embodiment, the SDN controller 130 determines that the first device 120 and the second device 121 are within the geo-fenced volume 102, and applies the appropriate policies 150 to the devices through the geo-fencing application 140. Since the first device 120 and the second device 121 are both within the geo-fenced volume 102, any differences within permissions, which are applied by the policies 150 to the first device 120, and the second device 121 can be based on differences between a user profile of the first device 120, and a device profile of the second device 121.

The SDN controller 130 can receive a GPS data as a geographical location of the device. The geographical location of the device can be compared to the geo-fenced volume 102 to determine if the first device 120 or the second device 121 are within the geo-fenced volume 102. The SDN controller 130 can also incorporate a control adjustment based on the accuracy or margin of error of the GPS data of the devices. In various embodiments, the GPS data can be inaccurate depending on satellite availability or other external forces. Examples of external forces can include poor weather conditions, movement of the device, or obstructions between the device and the satellites. The SDN controller can plan for these inaccuracies and incorporate the control adjustment when necessary.

In various embodiments, the geo-fencing application 140 applies the policies 150 to the SDN controller 130 which can communicate the policies 150 to the first device 120 and the second device 121. The geo-fencing application 140 can pre-filter access to the network for increased security advantages. In an example of pre-filtering, the geo-fencing application 140 can detect intrusions on the network of the geo-fenced volume 102 by filtering. The filtering can include a set of rules or permissions the policies 150 can use to determine if a packet would need further analysis, while packets considered benign can be allowed through. The first device 120 and the second device 121 can connect to the SDN controller 130, which applies the policies 150 of the geo-fenced volume 102 to the devices. The policies 150 can be used to determine the permissions, or the internet 110 access of the devices. The internet 110 access of the devices can be limited depending on the policies 150 of the geo-fenced volume 102.

In various embodiments, the policies 150 can implement one or more permissions on the devices based on the geo-fenced volume 102. The one or more permissions can vary depending on the geo-fenced volume 102. Examples of the one or more permissions of the policies 150 on the geo-fenced volume can include internet limitations, security limitations, service injections, network reconfiguration, or access limitations. The policies 150 can be applied by the geo-fencing application 140 which manages the policies 150 of the geo-fenced volume 102, and applies the policies of the geo-fenced volume through the SDN controller 130 to which the first device 120, and the second device 121 are connected. Described further herein, the one or more permissions of the geo-fenced volume can be used to protect the secure network from devices outside the geo-fenced volume, or devices outside the geo-fenced volume attempting to connect remotely to the secure network.

For an example of security limitations, if a device is within a first geo-fenced volume with a first security level, but the device is trying to access files of a second geo-fenced volume with a second security level. The policies 150 can require a user to input a security password, or the device can move to a geographical location within the second geo-fenced volume with the second security level. In an additional example, if the geo-fenced volume 102 is a building of a company, the policies 150 may have increased permissions to limit the use of an employee's mobile phone on the wireless internet 110 of the geo-fenced volume 102. Example limitations of an employee's mobile device can include not allowing the mobile device of the user to connect to network drives, or offer a limited usage of the internet 110 on a mobile device.

For an example of internet limitations, a public wireless network is being hosted by a coffee shop. The coffee shop can implement internet limitations pertaining to the usage of their services by their customers that are within the geo-fenced volume 102 of the coffee shop. The policies 150 can be implemented by the geo-fencing application 140 of the network of the coffee shop which could include a refreshable time limit, which can refresh the time limit by purchasing an item. For example, if the policies 150 of the geo-fenced volume 102 determine that there is a four hour usage limit on the internet 110 per device, the first device 120 may be unable to connect to the internet 110 after the four hour time limit without purchasing another drink. Another example of the policies 150 implementable on the network of the coffee shop could include a restricted site list. The policies 150 can implement the restricted site list preventing devices from accessing restricted websites.

In various embodiments, a second device 121 can be a resource managed by a SDN controller 130. The second device 121, which became a resource, can have a determined geographical location within the geo-fenced volume 102. Where the geographical location of the device includes a latitude, a longitude, and an altitude. The second device 121 can also have one or more network permissions. For example, resources can include storage devices, or other information technologies (IT) resources. The resources can be managed by external applications that are operating upon the software defined network. The external applications can be ran upon northbound application program interfaces (API). The northbound API can allow external applications to manage the resources or lifecycle of the geo-fenced volume.

In various embodiments, if the determination of the first device 120 is within a geo-fenced volume 102. A first condition can be generated where the user is within the geo-fenced volume 102. The first condition can include one or more network permissions through the policies 150. The one or more network permissions can be based on a user's profile and geographical location of the first device 120. For example, a network permission may include access to resources within the geo-fenced volume 102, where a first user's profile owned by a first user can have access to the resource, whereas a second user's profile owned by a second user may not have access to the same resource.

According to various embodiments, an order of the operations of one or more permissions of policies 150 can occur simultaneously or vary in order depending on the geo-fenced volume 102 and the user profile of the device 120. In various embodiments, the order of the operations can be set up such that it proceeds stepwise for consistency. For example, the order of the operations can proceed stepwise to ensure that each of the one or more permissions implemented by the policies 150 are applied in sequence to each user without changing. The one or more permissions may need to be implemented stepwise to ensure that each of the one or more permissions are applied to each user. In various embodiments, the order of the operations may be random to prevent service predictability. For example, the order of operations may be random to provide system safety. The system safety, through applying the one or more permissions randomly, can be implemented to prevent a user from creating loopholes within an access path. An example of a loophole within the application of the one or more permissions can include applying the one or more permissions that should have not been applied, or skipping the one or more permissions that should have been applied.

Figure 2A:
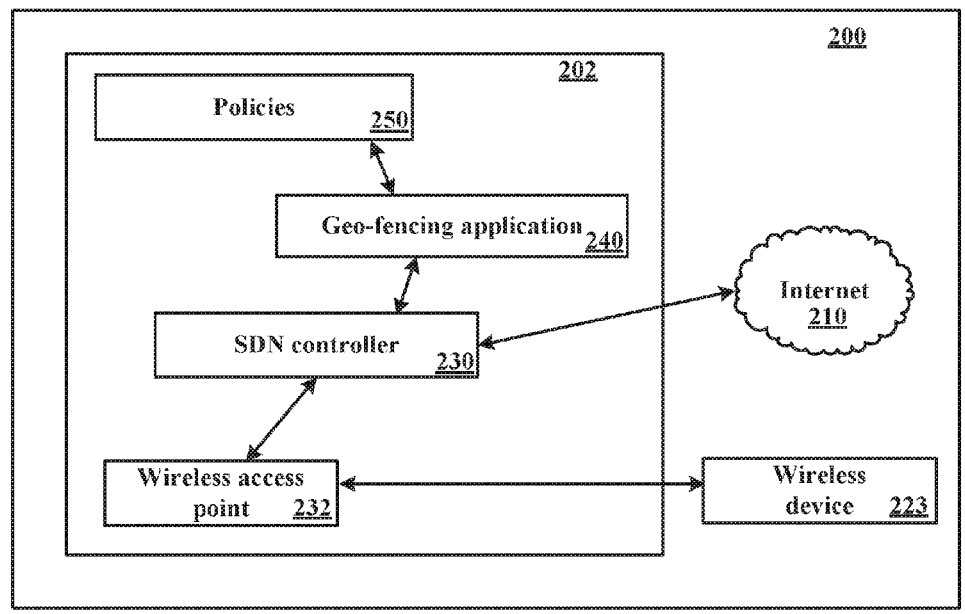
FIG. 2A illustrates a geo-fenced volume of a network where a wireless device is located outside the geo-fenced volume and is attempting to connect to the network, according to various embodiments.
Figure 2B:
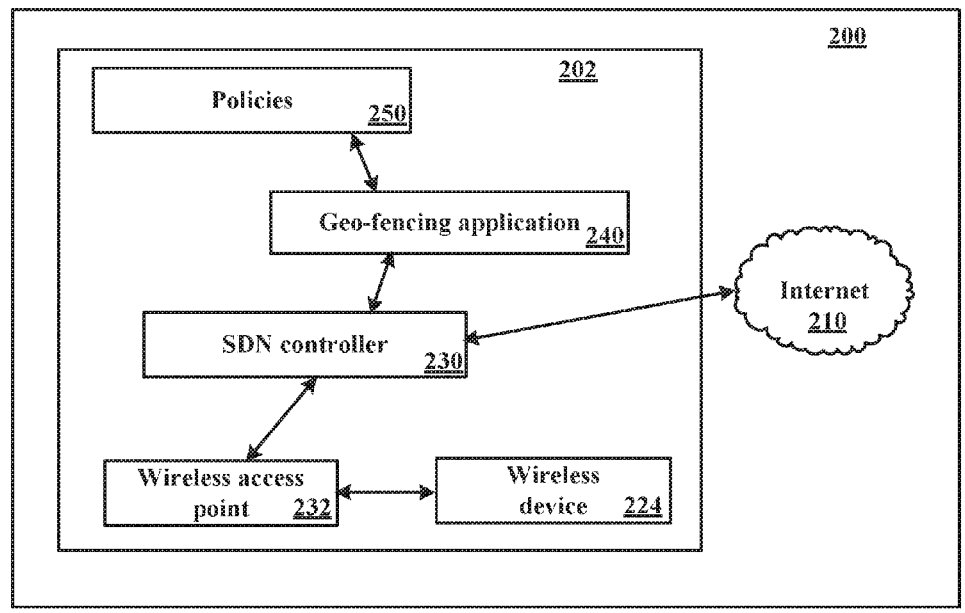
FIG. 2B illustrates a geo-fenced volume of a network where a wireless device is located within the geo-fenced volume and is attempting to connect to the network, according to various embodiments.

FIG. 2A and FIG. 2B illustrate an embodiment of a wireless device attempting to access a geo-fenced volume. Policies 250 are applied to the wireless device based on the location of the wireless device in relation to the geo-fenced volume 202. In FIG. 2A the wireless device 223 is outside the geo-fenced volume 202, and in FIG. 2B the wireless device 224 has entered the geo-fenced volume 202.

FIG. 2A illustrates an embodiment of the geo-fenced volume 202 where a user is operating a wireless device 223 within a volume 200, but outside the geo-fenced volume 202. In embodiments, the wireless device 223 may be able to enter and exit the geo-fenced volume 202. When the wireless device 223 is outside the geo-fenced volume 202, the policies 250 of the geo-fenced volume 202 can be applied on the wireless device 223 outside the geo-fenced volume 202. The policies 250 are applied through the geo-fencing application 240 that is connected to the software defined network (SDN) controller 230, and the SDN controller 230 can apply the policies 250 to the wireless device 223 outside the geo-fenced volume 202. In embodiments the SDN controller 230 determines, through the GPS gathered from the wireless device 223, that the wireless device 223 is outside the geo-fenced volume 202 and the SDN controller applies permissions of the policies 250 for when the device 223 is outside the geo-fenced volume 202.

In various embodiments, the policies 250 may allow the wireless device 223 limited network access to the geo-fenced volume 202 or allow access to the internet 210 through the SDN controller 230, but not allow the device access to any network files through the SDN controller 230. For example, a user on the wireless device 223 may attempt to access the network while outside the geo-fenced volume 202 of the network. Consequently the device may be able to receive a wireless signal from the SDN controller 230 but may be unable to access the network, or any drives connected to the network of the geo-fenced volume 202.

In various embodiments, the policies may allow the device the ability to connect to the network, but not allow usage of the network unless the device is within the geo-fenced volume 202. For example, the geo-fenced volume 202 could be a coffee shop. To monitor their network, the geo-fenced volume 202 could require the wireless device 223 to be within the geo-fenced volume 202 to connect to the internet 210 of the coffee shop. If the wireless device 223 has not yet entered the geo-fenced volume 202 of the coffee shop, the policies 250 can deny access to the wireless device 223 until the wireless device 223 enters the geo-fenced volume 202 of the coffee shop.

FIG. 2B illustrates an embodiment of a device entering the geo-fenced volume 202 of the SDN. The location of a wireless device 224 has been located such that the wireless device 224 is inside the geo-fenced volume 202. When the device 224 is located within the geo-fenced volume 202, the user of the wireless device 224 can become a trusted user. An example of a trusted user can be an employee having a security clearance to be within the geo-fenced volume 202. To enter the geo-fenced volume the device may have had to pass through an access point. The access point can require a user to provide an authentication to enter the geo-fenced volume 202. Since the device has access to be within the geo-fenced volume, the device can be granted access to the network after applying policies 250. The policies 250 are permissions that can be applied upon the wireless device 224 connected to the network of the geo-fenced volume 202. The policies 250 are applied through the SDN controller 230 which uses the geo-fencing application 240 to communicate the policies 250 to the SDN controller 230. For example, in a coffee shop, the device with the wireless device 224 can be granted access to the network of the geo-fenced volume 202 and be able to connect to the internet 210 after entering the geo-fenced volume 202 of the coffee shop.

Figure 3:
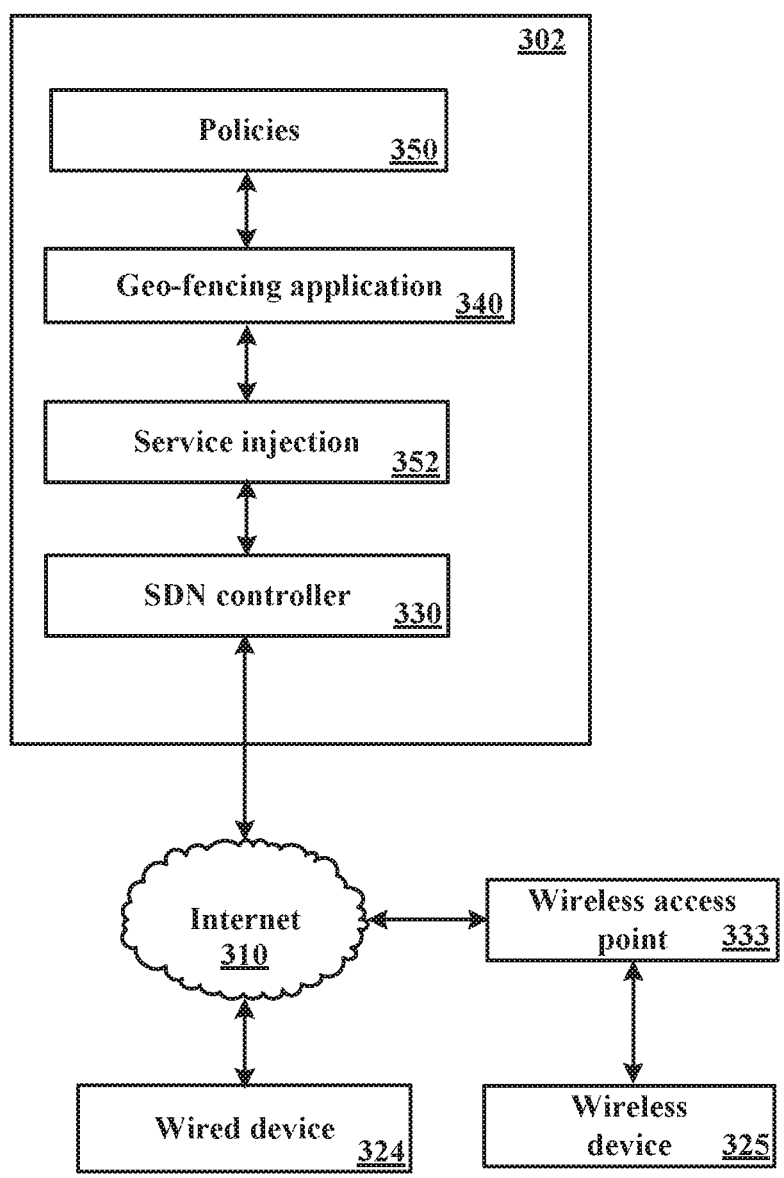
FIG. 3 illustrates a wireless device outside the defined geo-fenced volume attempting to remotely connect to the geo-fenced volume, according to various embodiments.

FIG. 3 illustrates an embodiment of a geo-fenced volume 302 being accessed remotely with a device through an internet 310 connection. When the device attempts to access the geo-fenced volume 302 through the internet 310, the policies 350 can be dynamically adjusted to protect the geo-fenced volume 302. A user can attempt to access the geo-fenced volume remotely using a device connected to the internet 110. Example devices that can connect to the network remotely can include a wired device 324, or a wireless device 325 through a wireless access point (WAP) 333. The device can access the internet 310 to connect remotely to the SDN controller 330, which can apply the policies 350. The policies can be capabilities or constraints on the device inserted by the policies 350 of the geo-fenced volume 302. The policies 350 are still applied to the device even though the device is not within the geo-fenced volume 302. In some embodiments, before the device is able to access any files on the network the policies 350 may incorporate a service injection 352. The service injection can be operated by the geo-fencing application 340. Examples of the service injections 352 can include deep packet inspection (DPI), and encryption. Both of these service injections 352 may occur in sequence or simultaneously to protect the geo-fenced volume 302.

Examples of encryption software may include symmetric key encryption or asymmetric key encryption. For example, encryption can be used to provide safety for file transfers to protect any data files from getting into the wrong hands of a third party. In embodiments, asymmetric encryption can be used to determine the authenticity of the device with the digital signature of a user. The digital signature of the user can be utilized when a user encrypts an access message with their private key that only they own. The access message can be unlocked by a public key the user has provided which can be stored on the SDN controller 330. Since the user sealed the message with their private key that only the user has, the access message must have come from the device of the user.

In embodiments, deep packet inspection may be used to protect the network from intrusions. Deep packet inspection can be, for example, a set inspection point during the transfer of the packets between the device and a network. Examples of intrusions found within packets can include viruses, spam, or intrusions on the network within the geo-fenced volume 302. Another example of deep packet inspection can include efficient network management, which can be used to prevent eavesdropping or provide moderation of internet usage within the geo-fenced volume 302. An example of moderation of internet usage can be, a blocked website list.

In various embodiments, remote access may require authentication of a device based on a user profile located on the device. A software defined network (SDN) controller can request an authentication of the device based on a security access level. To access the geo-fenced volume remotely the SDN controller can require the device to have a security access level greater than or equal to the security access level of the geo-fenced volume controlled by the SDN controller. In various embodiments, the security access level can be preloaded upon each device and the user of the device can need to input an authentication to confirm the identity of the user. In various embodiments, the user may need to be authenticated to use the device, and an authentication can be programmed into the access of the device. Examples of authentication can include a biometric identity marker scan or an authentication identifier of the user. Examples of a biometric identity marker scan can include a retinal scan, a fingerprint scan, or a voice recognition scan. Examples of an authentication identifier can include a password or a personal identification number (PIN).

Figure 4:
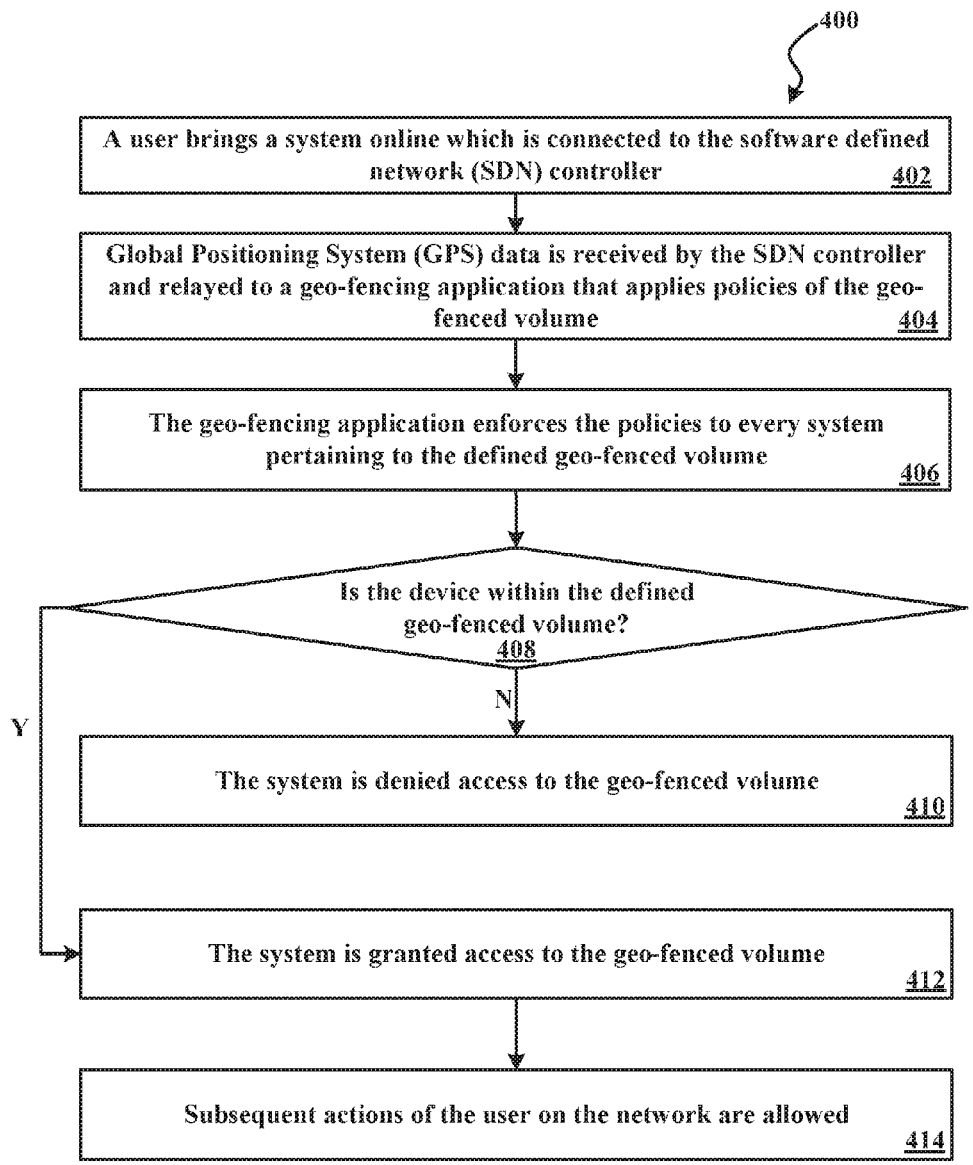
FIG. 4 is a flow chart of policies of a geo-fenced volume being applied to systems directly connected within the geo-fenced volume, according to various embodiments.

In FIG. 4 is a flow chart 400 of an embodiment of a device attempting to access a geo-fenced volume through a software defined network (SDN) controller. In operation 402, a device turns on or is connected to the software defined network (SDN) through the SDN controller. The connection of the device to the SDN controller can include a wired or a wireless connection.

In operation 404, the global positioning system (GPS) data or geographical location of the device is received by the SDN controller, and is relayed to a geo-fencing application which applies policies of the geo-fenced volume to the device. The GPS determines the current geographical location of the device and relays the information of the geo-fencing application. The geographical location of the device can include a latitude, a longitude, and an altitude. Upon receipt of the geographical location of the device, policies can be determined based on the permissions of a user profile and the network permissions of the SDN.

In operation 406, the geo-fencing application enforces one or more network permissions of the policies using the GPS data gathered by the SDN controller. The network permissions can determine the access path of the device. The access path can include one or more permissions based on the geo-fenced volume. An example of network permissions can include resource access. The one or more permissions can include geo-fenced volume or resource access based on a user profile.

In operation 408, a determination is made of the geographical location of the device and if the device is within the geo-fenced volume of the software defined network according to the GPS data. The GPS data includes the geographical location of the device, and the geographical location of the device can be compared to the GPS data of the geo-fenced volume. The GPS data of the geo-fenced volume can include a range of latitudes, a range of longitudes, and a range of altitudes. If the geographical location of the device is within the range of latitudes, the range of longitudes, and the range of altitudes of the geo-fenced volume the device can be granted access to the geo-fenced volume. If the geographical location of the device is outside the range of latitudes, the range of longitudes, or the range of altitudes of the geo-fenced volume the device can be denied access to the geo-fenced volume.

In operation 410, if the geographical location of the device is not within the geo-fenced volume of the software defined network, the device can be denied access to the geo-fenced volume. The denial of access to the geo-fenced volume includes determining that the geographical location of the device is outside the range of latitudes, the range of longitudes, or the range of altitudes of the geo-fenced volume. If the device is outside of any one of the three ranges, the device can be denied to the geo-fenced volume.

In operation 412, if the geographical location of the device is within the geo-fenced volume of the software defined network, the device can be granted access to the geo-fenced volume. The allowance of access to the geo-fenced volume includes determining that the geographical location of the device is within the range of latitudes, the range of longitudes, and the range of altitudes of the geo-fenced volume. If the device is within all of the three ranges the device can be granted to the geo-fenced volume.

In operation 414, since the device was granted access they are allowed subsequent actions on the network. Subsequent actions upon the network can be based on security allowances of the geo-fenced volume that are defined by the one or more permissions, applied by the policies of the geo-fenced volume. For example, one or more permissions can include allowing access to resources within the geo-fenced volume.

Figure 5:
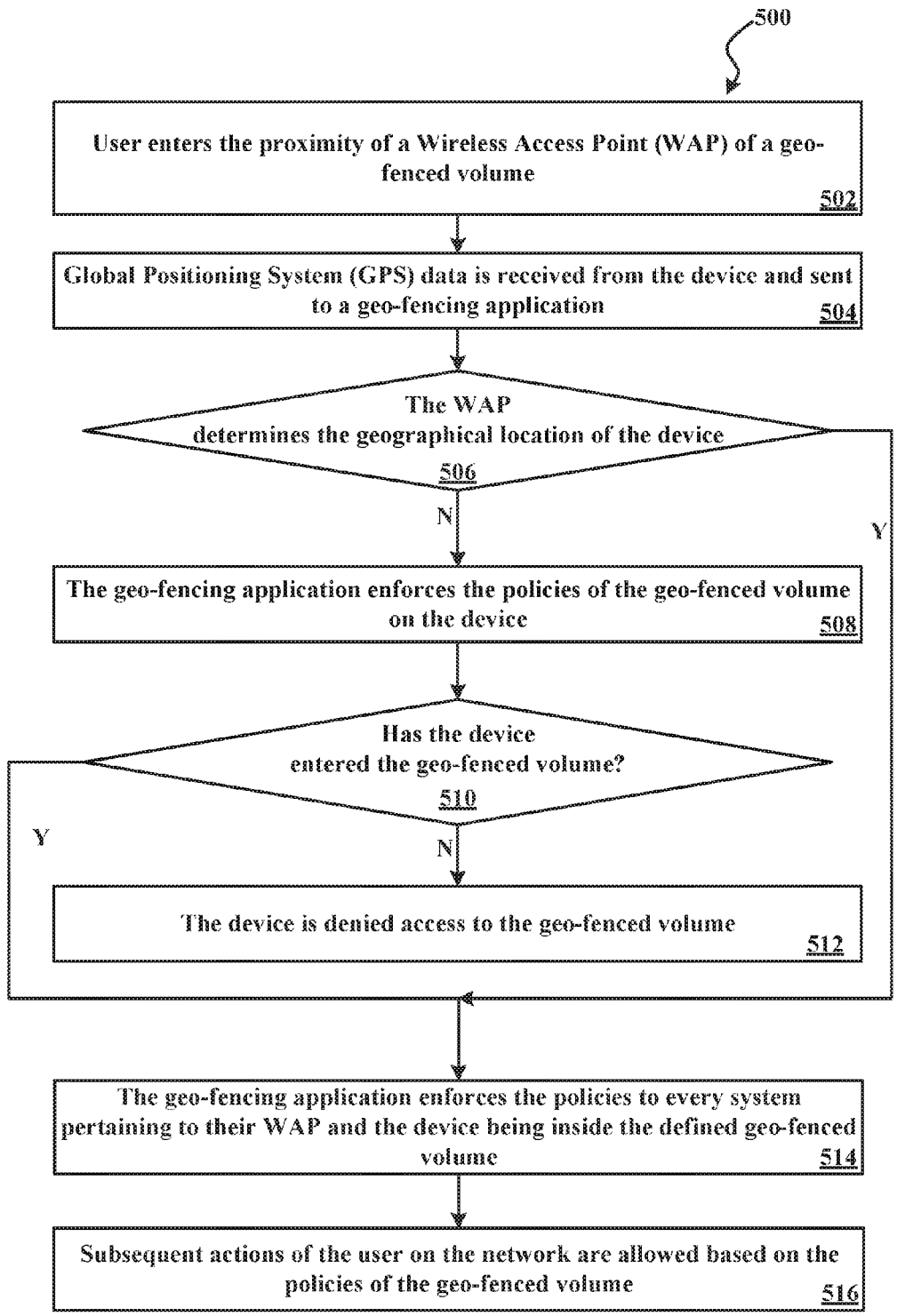
FIG. 5 is a flow chart of policies of a geo-fenced volume being applied to systems being connected to the wireless network and moving from outside of the geo-fenced volume into the geo-fenced volume, according to various embodiments.

In FIG. 5 a flow chart 500 of an embodiment including the access of a device, where the device is granted access or denied access depending on the GPS data of the device compared to the geo-fenced volume.

In operation 502, a device enters a proximity boundary of a geo-fenced volume aware wireless access point (WAP). The WAP can be connected to a software defined network (SDN) controller that manages a geo-fenced volume. The SDN controller monitors the devices connected through the WAP, and determines an access of the device based on a geographical location of the device.

In operation 504, the WAP receives GPS data in the form of a geographical location, from the device attempting to access the network of the geo-fenced volume. The GPS data is sent to a geo-fencing application that can apply policies to the device based on the geographical location of the device. The policies can include one or more network permissions, based on a user profile of the device.

In operation 506, the WAP of the geo-fenced volume uses the geographical location of the device that was sent to the geo-fencing application to determine if the device is within the geo-fenced volume. The geo-fencing application then applies policies of the geo-fenced volume upon the device. The geo-fencing application makes a determination, based on the GPS data of the device and the policies of the geo-fenced volume, whether the device is within or outside the geo-fenced volume of the software defined network. The one or more permissions can include geo-fenced volume or resource access based on a user profile. A determination of the devices location can include GPS data. The GPS data includes the geographical location of the user, and the geographical location of the user can be compared to the GPS data of the geo-fenced volume. The GPS data of the geo-fenced volume can include a range of latitudes, a range of longitudes, and a range of altitudes. If the geographical location of the device is within the range of latitudes, the range of longitudes, and the range of altitudes of the geo-fenced volume the device can be granted access to the geo-fenced volume. If the geographical location of the device is outside the range of latitudes, the range of longitudes, or the range of altitudes of the geo-fenced volume the device can be denied to the geo-fenced volume. If the device is within the geo-fenced volume the flowchart can progress to operation 514.

In operation 508, if the device is not within the geo-fenced volume of the software defined network the geo-fencing application enforces the policies of the geo-fenced volume based on the device based on the device being outside the geo-fenced volume of the software defined network. If the geographical location of the device is not within the geo-fenced volume, the device can be denied access to the geo-fenced volume. The denial of access to the geo-fenced volume includes determining that the geographical location of the device is outside the range of latitudes, the range of longitudes, or the range of altitudes of the geo-fenced volume. If the device is outside of any one of the three ranges, then the device can be denied to the geo-fenced volume. If the device is outside the geo-fenced volume, then one or more permissions can be applied to the device. The one or more permissions can include access to a determined list of the one or more resources of the geo-fenced volume but not others included in the resource list. An example of access of the one or more resources can include access to the internet through the WAP, but not to any of the storage devices of the geo-fenced volume.

In operation 510, the device can move the GPS location of the wireless device into the geo-fenced volume of the software defined network. If the geographical location of the device is changed to be within the geo-fenced volume a determination can be made whether the device is within the geo-fenced volume or outside the geo-fenced volume. If the geographical location of the device is within the geo-fenced volume of the network the flowchart can progress to operation 514.

In operation 512, if the device has not entered the geo-fenced volume, the device is denied access to the remaining resources of the resource list of the geo-fenced volume previously denied in operation 508. In various embodiments, the device can remain connected to the WAP and use the one or more resources provided by the geo-fenced volume when the device is outside the geo-fenced volume. For the device to access other resources of the network, the geographical location of the device can be required to be within the geo-fenced volume.

In operation 514, the geo-fencing application enforces the policies to the device of the device pertaining to the WAP and the GPS location of the device being within the defined geo-fenced volume. If the geographical location of the device is within the geo-fenced volume of the software defined network, the device can be granted access to the geo-fenced volume. The allowance of access to the geo-fenced volume includes determining that the geographical location of the device is within the range of latitudes, the range of longitudes, and the range of altitudes of the geo-fenced volume. If the device is within all of the three ranges the device can be granted to the geo-fenced volume.

In operation 516, since the device was granted access they are allowed subsequent actions on the network based on security allowances of the geo-fenced volume that are defined by the policies of the geo-fenced volume. Since the device was granted access they are allowed subsequent actions on the network. Subsequent actions upon the network can be based on security allowances of the geo-fenced volume that are defined by the one or more permissions applied by the policies of the geo-fenced volume. For example, one or more permissions can include allowing access to resources within the geo-fenced volume.

Figure 6:
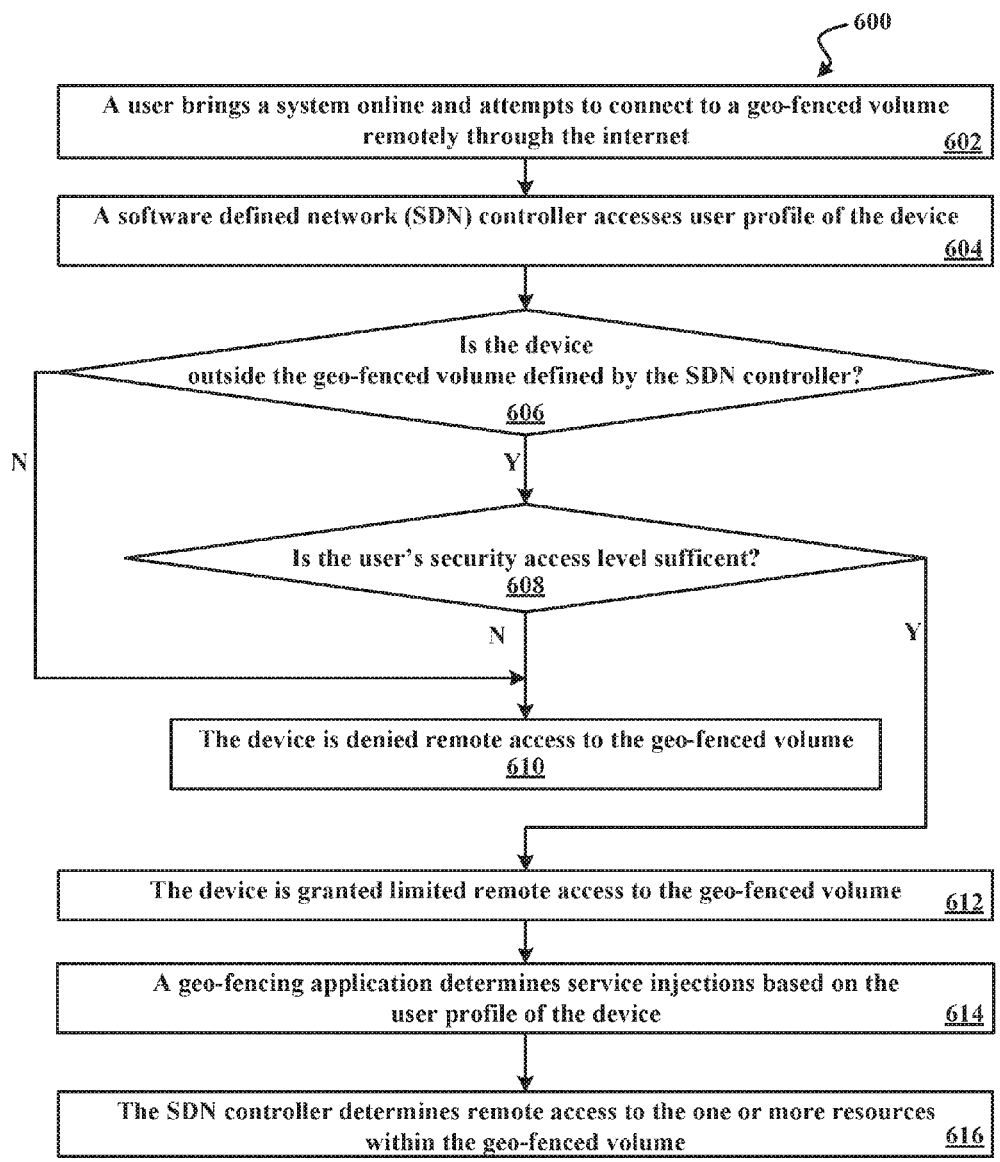
FIG. 6 is a flow chart of policies of a geo-fenced volume being applied to systems connected remotely to the geo-fenced volume, according to various embodiments.

FIG. 6 is a flow chart 600 of an embodiment, where a device attempts to access a network of a geo-fenced volume by connecting remotely to the network. The remote connection of the device to the network can allow the device to access the resources of the network while being outside the geo-fenced volume of the network. To determine the access of the device a user profile can be implemented to determine the access to the one or more resources of the software defined network.

In operation 602, a user brings a system online and attempts to connect to a geo-fenced volume remotely through the internet. In various embodiments, remote connection to the geo-fenced volume can require the device to be outside the geo-fenced volume before a remote connection is allowed. The remote connection can allow the device to access one or more resources of the geo-fenced volume without being within the geo-fenced volume. Since the device is not within the geo-fenced volume, a user profile can be used to determine a security access of the user to connect to the geo-fenced volume remotely.

In operation 604, a software defined network (SDN) controller accesses the user profile of the device. The user profile can include the access credentials of the device to connect to the geo-fenced volume remotely. In various embodiments, the user profile can include a geographical location information of the device and a user's security information. The geographical location information can include a current geographical location of the device, which can include a latitude, a longitude, and an altitude of the device. The user's security information can include a security access level. The security access level can include the credentials to access a geo-fenced volume remotely. In various embodiments, the user may be required to be authenticated. Examples of authentication can include a biometric identity marker scan or an authentication identifier of the user. An example of a biometric identity marker scan can include a retinal scan, a fingerprint scan, or a voice recognition scan. An example of an authentication identifier can include a password or a personal identification number (PIN).

In operation 606, the SDN controller determines that the device is outside of the geo-fenced volume defined by the SDN controller. The determination of the location of the device uses the geographical location information of the user profile. The SDN controller can compare the current geographical location of the device, which can include a latitude, a longitude, and an altitude of the device to the geographical location of the geo-fenced volume. The geographical location of the geo-fenced volume can include a global position service (GPS) data of the geo-fenced volume. The GPS data of the geo-fenced volume can include a range of latitudes, a range of longitudes, and a range of altitudes. In various embodiments, for the device to be within the geo-fenced volume, the device can be required to be within the range of latitudes, the range of longitudes, and the range of altitudes. If the device is outside the geo-fenced volume, then the flowchart can progress to operation 608. If the device is within the geo-fenced volume, then the flowchart can progress to operation 610 where the device is denied remote access to the geo-fenced volume. In various embodiments, if the device is within the geo-fenced volume, then remote access can be unnecessary because the device is already within the geo-fenced volume.

In operation 608, the SDN controller determines if the user's security access level is sufficient. To determine the sufficiency of the user's security access level the SDN controller compares the user's credentials and compares the user's credentials to a required credentials. The SDN controller can connect to the device and access the user profile of the device. Within the user profile the user's security information can be accessed by the SDN controller. The user's security information can include a security access level. The security access level can include the user's credentials to access a geo-fenced volume remotely. The user's credentials are accessed and compared to the required credentials for remote access to the geo-fenced volume. If the user's security information of the user profile of the device is sufficient to access the geo-fenced volume remotely the flowchart progresses to operation 612. If the user's security information of the user profile of the device is insufficient to access the geo-fenced volume remotely the flowchart progresses to operation 610.

In operation 610, the device is denied remote access to the geo-fenced volume. In various embodiments, the device can be denied access based on the device being within the geo-fenced volume. In various embodiments the device can be denied access based on the user's security information being insufficient to access the geo-fenced volume remotely. If the device is denied remote access to the geo-fenced volume, then the user's security information can be altered by the user to increase the security access level if allowed by the SDN controller.

In operation 612, the device is granted limited remote access to the geo-fenced volume. The limited remote access is granted by the SDN controller to the device to access the geo-fenced volume, but remains limited until further access to the geo-fenced volume is determined. The determination of further access to the geo-fenced volume can be done in operations 614 and 616. An example of limited access can include access to a remote access resource list of one or more resources within the geo-fenced volume. An example the remote access resource list can include access to an online mail server.

In operation 614, a geo-fencing application determines service injections based on the user profile of the device. The geo-fencing application can use the user's security information of the device to determine service injections that can be implemented. The service injections can be implemented to protect the geo-fenced volume and the device. Examples of service injections can include deep packet inspection (DPI) and encryption. The service injections can be implemented through the SDN controller to the device.

In operation 616, the SDN controller can determine remote access of the device to the one or more resources within the geo-fenced volume. In various embodiments, the SDN controller can manage the remote access to the one or more resources located within the geo-fenced volume. The SDN controller can use the user's security information located on the user's profile, to determine the remote access of the device to the one or more resources within the geo-fenced volume.

Figure 7A:
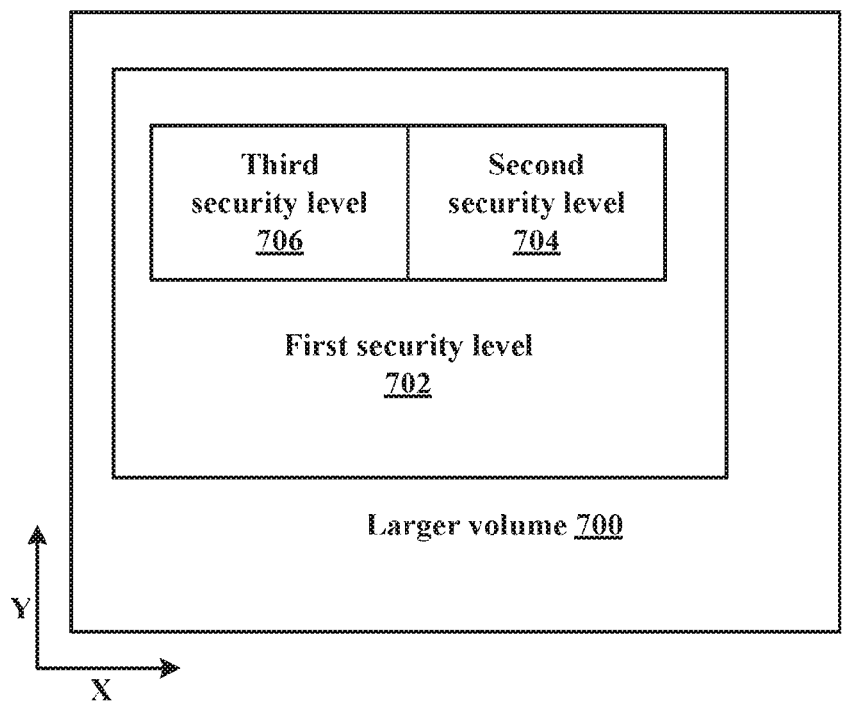
FIG. 7A illustrates a multi-level security zone enforcement environment with separate set of geo-fenced volumes within a horizontal plane, according to various embodiments.
Figure 7B:
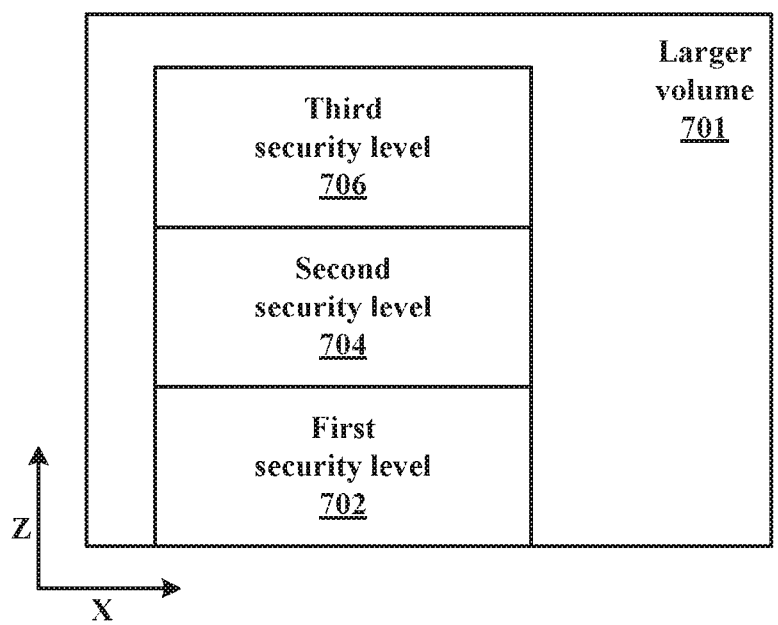
FIG. 7B illustrates a multi-level security zone enforcement environment with separate set of geo-fenced volumes within a vertical plane, according to various embodiments.

FIGS. 7A and 7B illustrate separate security levels within a geo-fenced volume. The locations of the security levels can be based on a coordinate system and an altitude range. The coordinate system can be based on a set of latitudes, longitudes, and altitudes to define a set geo-fenced volume of the software defined network within a larger volume. In embodiments, the set of latitudes and longitudes within the larger volume the coordinate system can be illustrated as an XYZ coordinate system where the X coordinates are the latitudes, the Y coordinates are the longitudes, and the Z coordinates are a range of altitudes. A reference XYZ coordinate system can be located in the lower left corners of the figures. In various embodiments, the shape of the geo-fenced volume can be irregular. In various embodiments, the device may have to cross boundaries of the geo-fenced volume to access the network of the geo-fenced volume.

In FIG. 7A, separate security levels have been established within a geo-fenced volume in the XY plane where the X coordinate is a set of latitudes, and the Y coordinate is a set of longitudes corresponding with the X coordinates. In embodiments, device may be required to cross physical barriers to access the different security levels. In embodiments, a larger volume 700 is defined, with multiple security zones within the XY plane. The geo-fenced volumes of the security zones can be a first security level 702, a second security level 704, and a third security level 706. Each security zone can require an authentication to enter the security zone. Examples of authentication can include badge access, biometrics, or guarded entries. In embodiments, depending on the policies of each of the security levels, a device in the third security level 706 could be able to access the networks both the second security level 704, and the first security level 702 because they have a higher security access.

The policies could also be configured to only allow access to the network of the zone you are in, limiting each device to only the network of the geo-fenced volume they are located in. For example, if the device is within the second security level 704, the device may only be able to access the network of the second security level 704. If the device within the second security level 704 attempted to access the first security level 702 or the third security level 706, the device could be denied access because the device is not within the geo-fenced volume. In this way each geo-fenced volume entity, first security level 702, second security level 704, and third security level 706, are separate and unable to be accessed, unless the device is within the geo-fenced volume the device is attempting to connect to.

In various embodiments, the security levels can also be dynamically adjusted to allow for outside operations to be performed. For example, if a second security level 704 and third security level 706 are both groups of servers to be upgraded and the technician does not have a security clearance to access the third security level 706, the security level of the third security level 706 can be adjusted down to the second security level 704 or a first security level 702, depending on the security level authentication of the technician. In an additional example, security level adjustment can be applied to virtual local area networks (VLANs) where dedicated servers may be grouped in accordance to their geo-fenced volumes and have separate policies attached to their according geo-fenced volume. If the servers are in need of an upgrade they can be placed on a specific security level and upgraded at once before being returned to their respective security levels.

FIG. 7B includes an embodiment of security levels of the geo-fenced volume being determined by an altitude range of the geo-fenced volume. In embodiments, the geo-fenced volume can be defined with the latitude, the longitude, and the altitude of the geo-fenced volume within a larger volume 701. The altitude can be defined as the height or distance measurement an object or person is above or below a determined zero height. Examples of determined zero heights can include the distance a device is above or below the ground level or above or below sea level. The measurement of the altitude can be related to sea level to determine if an altitude of a device is within a range of altitudes determined by the geo-fenced volume. In various embodiments, an altitude range can be fixed to require a device to be located within the altitude range of the secure zone. Separate security levels have been established within a geo-fenced volume in the XYZ coordinate system where the X coordinate is a set of latitudes, the Y coordinate is a set of longitudes, and the Z coordinate is a set or range of altitudes. In embodiments, device may be required to cross physical barriers to access the different security levels. In various embodiments, a larger volume 701 is defined with multiple security zones within the XZ plane. The geo-fenced volumes of the security zones can be first security level 702, second security level 704, and third security level 706. Each security zone can require authentication to enter the zone. Examples of authentication can include a biometric identity marker scan or an authentication identifier of the user. An example of a biometric identity marker scan can include a retinal scan, a fingerprint scan, or a voice recognition scan. An example of an authentication identifier can include badge access or guarded entries.

In various embodiments, the security zones can be required to be separate entities within the same larger volume 701, where the larger volume 701 can be an office building complex with multiple businesses in the same building. A set range of altitudes, in the Z direction using the coordinate system, can be assigned to each floor requiring the device to be within the range of altitudes to access the network of the geo-fenced volume.

For an example of requiring the device to be within a set range of altitudes, if a user is on a first floor with a first security level 702 with a wireless device, the device may be able to access or view the network of a second security level 704 on the second floor, but unable to connect to the network because the device is not within the range of altitudes of the geo-fenced volume of the second security level 704. The same can go for a device on the second floor attempting to access the network of the first floor or third floor. For example, if the device is located on the second floor with the second security level 704 and attempts to access the network of the first floor with the first security level 702 or a third floor with a third security level 706. The device can be denied the connection by both the first floor with the first security level 702, and the third floor with the third security level 706.

In various embodiments, the network may be configured such that the higher security levels can access the networks of the lower security levels. For example, if a device is located within the set range of altitudes of a third floor with a third security level 706, the device can access the network of a second floor with a second security level 704, and the network of a first floor with a first security level 702.

In various embodiments, of an addition of a second geo-fenced volume within a larger volume, a device profile may be accessed to determine permissions of the device within a first geo-fenced volume and the second geo-fenced volume. Whether the addition of the second geo-fenced volume is within the first geo-fenced volume, or the second geo-fenced volume is adjacent to the first geo-fenced volume the geographic location, including a latitude, a longitude, and an altitude, of the device can be gathered to determine if the device is within the first geo-fenced volume, the second geo-fenced volume, or neither. To determine which geo-fenced volume the device is within the second geo-fenced volume is defined as a second separate section of the network with a separate geographical coordinates, including the altitude of the second geo-fenced volume.

In various embodiments, the security zones can also grant one or more network permissions. The one or more network permissions can be based on a user's profile and geographical location of the device. For example a network permission may include access to resources within the geo-fenced volume where a first user's profile owned by a first user can have access to the resource, whereas a second user's profile may not have access to that resource. The one or more network permissions can also be applied to determine user's access though a point of access. An example of a point of access can include a locked doorway, where the user may need to present a biometric identity marker scan, or an authentication identifier of the user to enter the geo-fenced volume. For example, if a user wants to access a resource within a second security level 704, the user can change geographical location of the device to be located within the geographical location of the security level 704 to access the resource. The device may have to move from the first security level 702 to the second security level 704. To gain access to the second security level 704 the user may have to pass through the point of access, to be able to enter the second security level 704.

Figure 8:
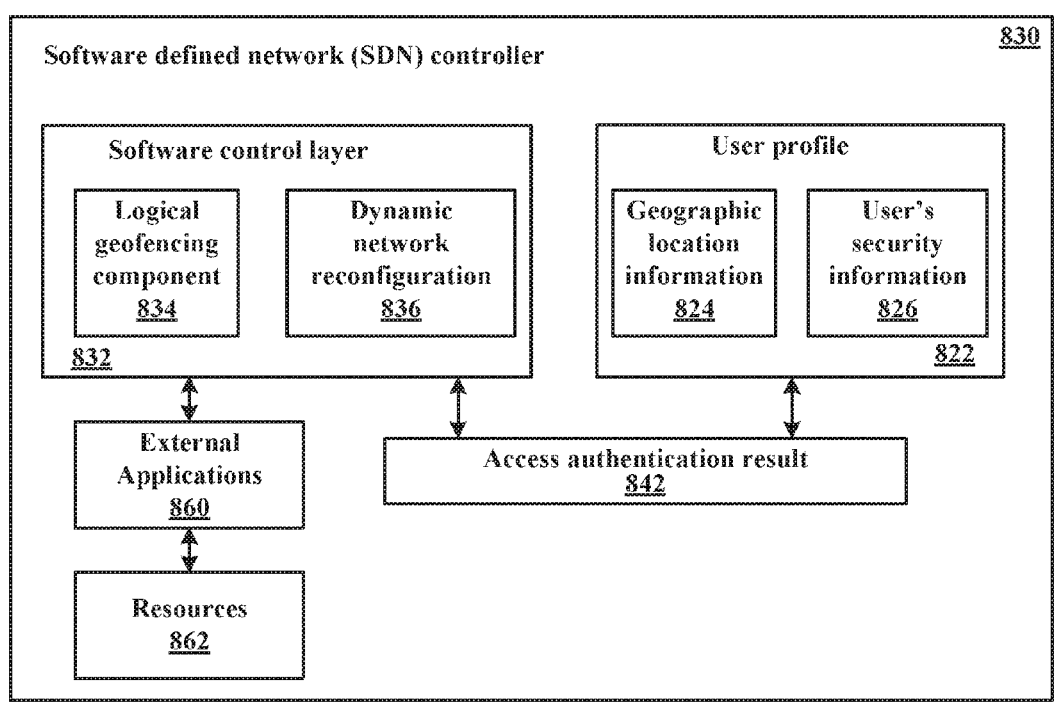
FIG. 8 illustrates an operation of the software defined network controller determining an access authentication, according to various embodiments.

In FIG. 8 a software defined network (SDN) controller 830 determines an authentication result of a device. When the device attempts to access the network, the SDN controller can receive information about the device and their device within a user profile 822. According to various embodiments, the user profile 822 can contain the geographic location information 824 of the user, and the user's security information 826. Network permissions of a user based on the user's security information can be transmitted to a software control layer 832 of the SDN controller 830. The software control layer 832 can contain the logical geofencing component 834 which can be received by the policies of the geo-fenced volume, and an ability to be dynamically reconfigured by a dynamic network reconfiguration 836 process.

The SDN controller 830 can use the dynamic network reconfiguration 836 to expand the SDN or customize the configuration of SDN. An example of SDN expansion by the dynamic network reconfiguration 836 process can be utilized to alter the size of the SDN, the location of the SDN, or the access to the SDN. In an example, the expansion of the alteration of the size of the SDN can be implemented to incorporate an addition or a removal of a section of the SDN. In various embodiments, altering the access of the SDN can include increasing or decreasing a security access level of the geo-fenced volume within the SDN to increase or decrease user access to the geo-fenced volume. Altering the access of the SDN can include decreasing the security access level of the geo-fenced volume to increase the user accessibility of the geo-fenced volume. The increasing of the user access to the geo-fenced volume can be done to allow outside technicians to work within locations they would otherwise not have access to. In another example, the security access of the geo-fenced volume can be increased in response to a breach within the SDN to prevent further intrusions upon the SDN.

In various embodiments, the software control layer 832 exists above a protocol layer in a hardware/software stack of the SDN controller 830 as a controller platform. The protocol layer of the hardware/software stack of the SDN controller 830 can include managing the flow of packets within the SDN, managing the control of the SDN through software instead of hardware, and facilitating SDN management. The management of the SDN controller 830 can configure the entire network to be managed by the single SDN controller 830 as a single console.

The logical geofencing component 834 can include the geographic location information of the geo-fenced volume and security level information of the geo-fenced volume. The dynamic network reconfiguration 836 process can be used to change the logical geofencing component 834 to alter the accessibility of the software control layer 832. An example of the use of the dynamic network reconfiguration 836 can be used to decrease the security level of a geo-fenced volume if a technician was needed to repair the network of the geo-fenced volume. If the device is within the geo-fenced volume based on the devices geographic location information 824, or the user's security information 826 of the user is within the range of the logical geofencing component, the device can be granted access by an access authentication result 842. The authentication result 842 can grant the user profile one or more network permissions in response to the first condition where the device is within the first geo-fenced volume.

In various embodiments, the user's security information 826 can include a biometric identity marker scan or an authentication identifier of the user. The user security information can be gathered to determine an access path of the user profile 822. The biometric identity markers of a user can be unique to each individual and can be used to determine the user's security information 826. Examples of the biometric identity markers scan can include a retinal scan, a fingerprint scan, or a speech recognition. The authentication identifiers of the user are objects or codes that can be given to the user instead of biometric identity markers which are traits of the user. Examples of the authentication identifiers of the user can include security badges, a key for a locked doorway, a password, or a personal identification number (PIN).

In various embodiments, the access authentication result 842 of the user can be accomplished with the device outside the geo-fenced volume remotely accessing the network of the geo-fenced volume through an internet connection. If the device attempts to connect to the network of the geo-fenced volume remotely the user's security information 826 of the user profile 822 can be required for authentication of the user to the network of the geo-fenced volume.

For example, because the device is attempting to access the network remotely outside of the geo-fenced volume, the geographic location information 824 of the device can indicate that the device is outside the geo-fenced volume. The indication of the device being outside the geo-fenced volume can result in a denial with the access authentication result 842. The denial result of the device can require the user's security information 826 to be observed by the software control layer 832 with the logical geofencing component 834. If the user's security information 826 passes the authentication of the logical geofencing component 834 the device can be allowed to remotely access the geo-fenced volume.

In an example of remote access, if a device is outside of the geo-fenced volume and connects to the geo-fenced volume remotely using the internet, the device may need to pass an authentication check. The authentication check can include using the user's security information 826 of the user to access the geo-fenced volume remotely due to the result of being denied access to the network due to their geographic location information being outside the geo-fenced volume.

By completing the authentication check, the device may be allowed remote access to the geo-fenced volume, or be denied access to the network of the geo-fenced volume. The denial of access can be due to the user's security information 826 is insufficient to allow to access of the device to the geo-fenced volume. In various embodiments, if the device has been denied remote access to the geo-fenced volume, and as long as the geo-fenced volume allows subsequent attempts of remote access, the device may attempt to use a higher security clearance access, or a second security information check to access the network of the geo-fenced volume.

In various embodiments, the user profile can determine accessible resources 862 within the geo-fenced volume that are connected to the network. The accessible resources 862 can be determined by the permissions granted based on the user's security information 826.

In various embodiments, external applications 860 can be used to manage the one or more resources of the software defined network (SDN). The resources 862 are assigned a geographical location within a first geo-fenced volume of the SDN. The external applications 860 operate upon the software defined network (SDN) controller 830 and can be implemented to increase the security of the SDN. The SDN controller 830 can also be communicatively coupled with external applications 860 or higher level components using a northbound application program interface (API). The northbound API can allow the external applications 860 to manage the resources 862 or a lifecycle of the geo-fenced volume. Examples of functionalities of external applications northbound API can implement can include receiving a resource lists, applying policies to resources, removing resources from the resource list, or quarantine resources from the resource list. The functionalities of the external applications 860 can be implemented on-the-fly, based on the device attempting to access the geo-fenced volume. The on-the-fly implemented external applications 860 can be used to reconfigure an access path of a user depending upon the geographical location of the user relative to the geo-fenced volume. The on-the-fly implemented external applications 860 can also be used along with the dynamic network reconfiguration 836 to dynamically manage all of the resources 862 within the geo-fenced volume.

Figure 9:
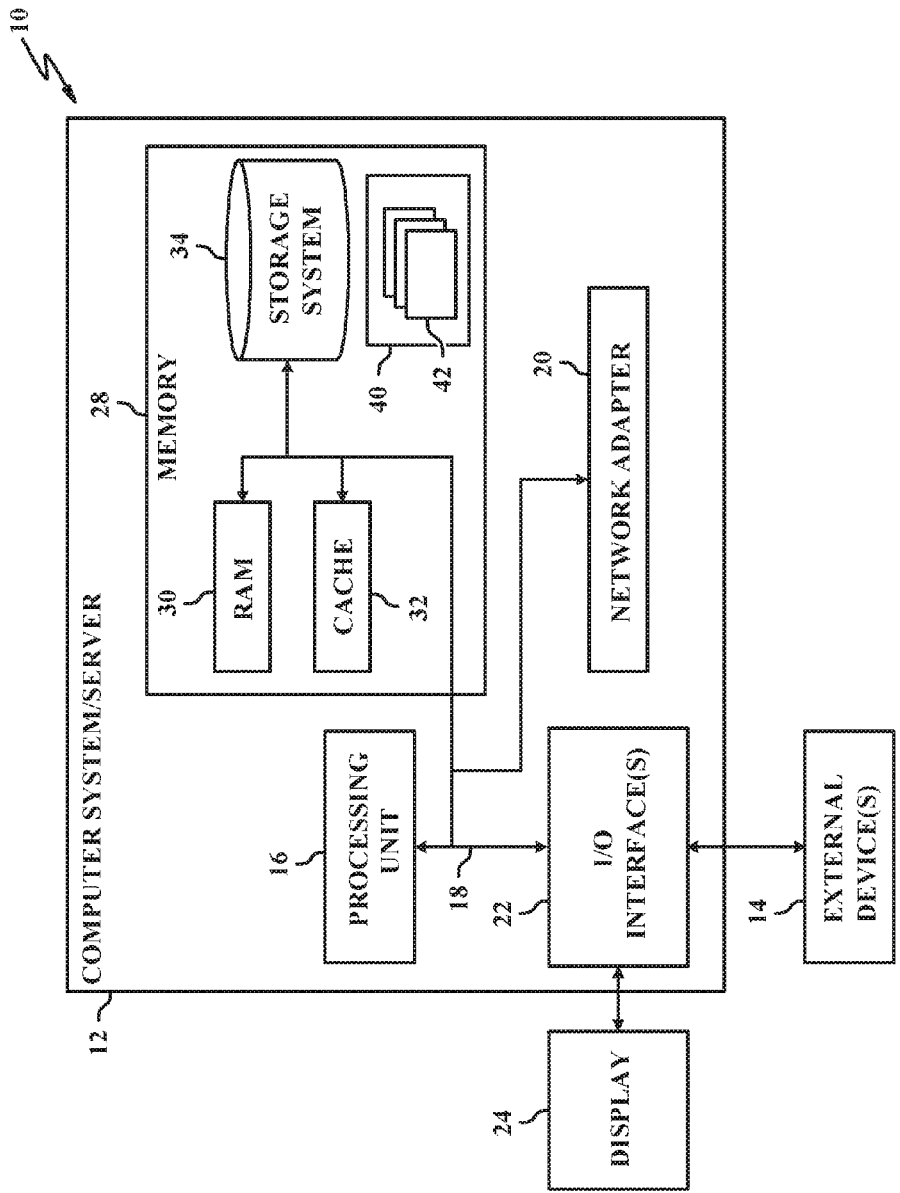
FIG. 9 depicts a cloud computing node according to an embodiment of the present invention.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
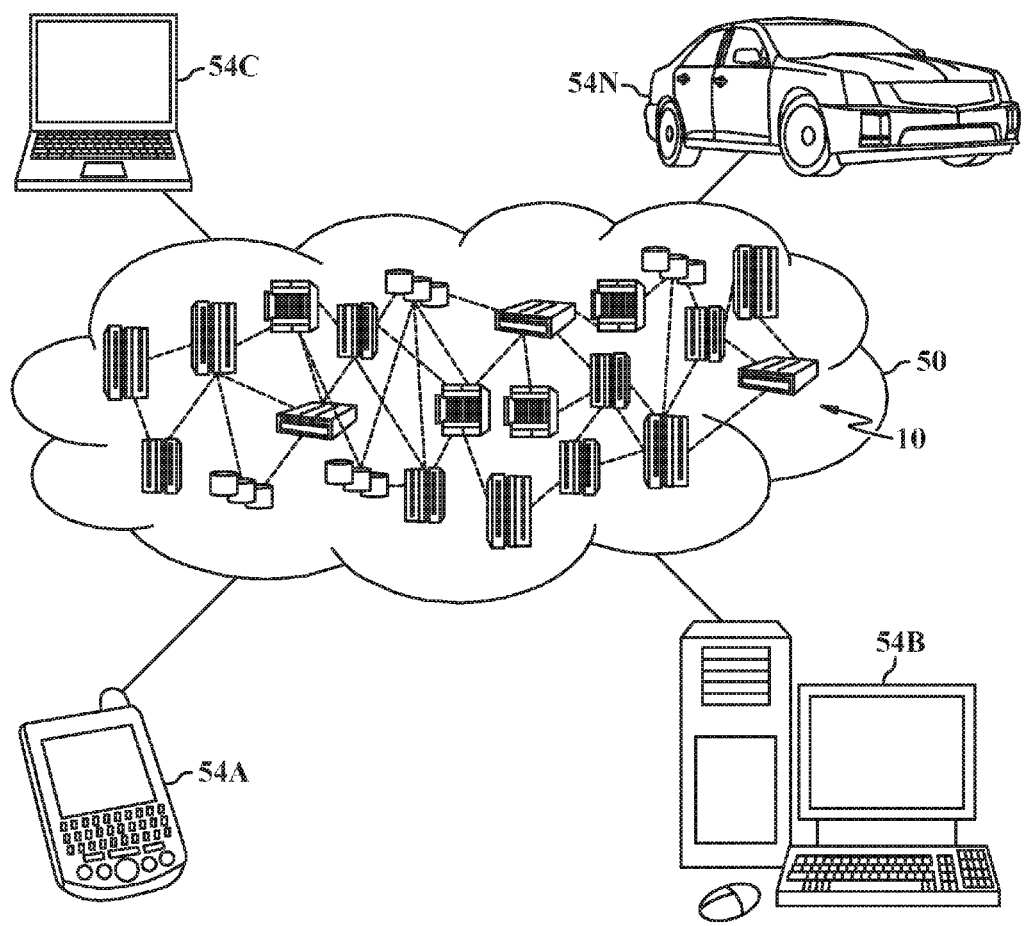
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 11:
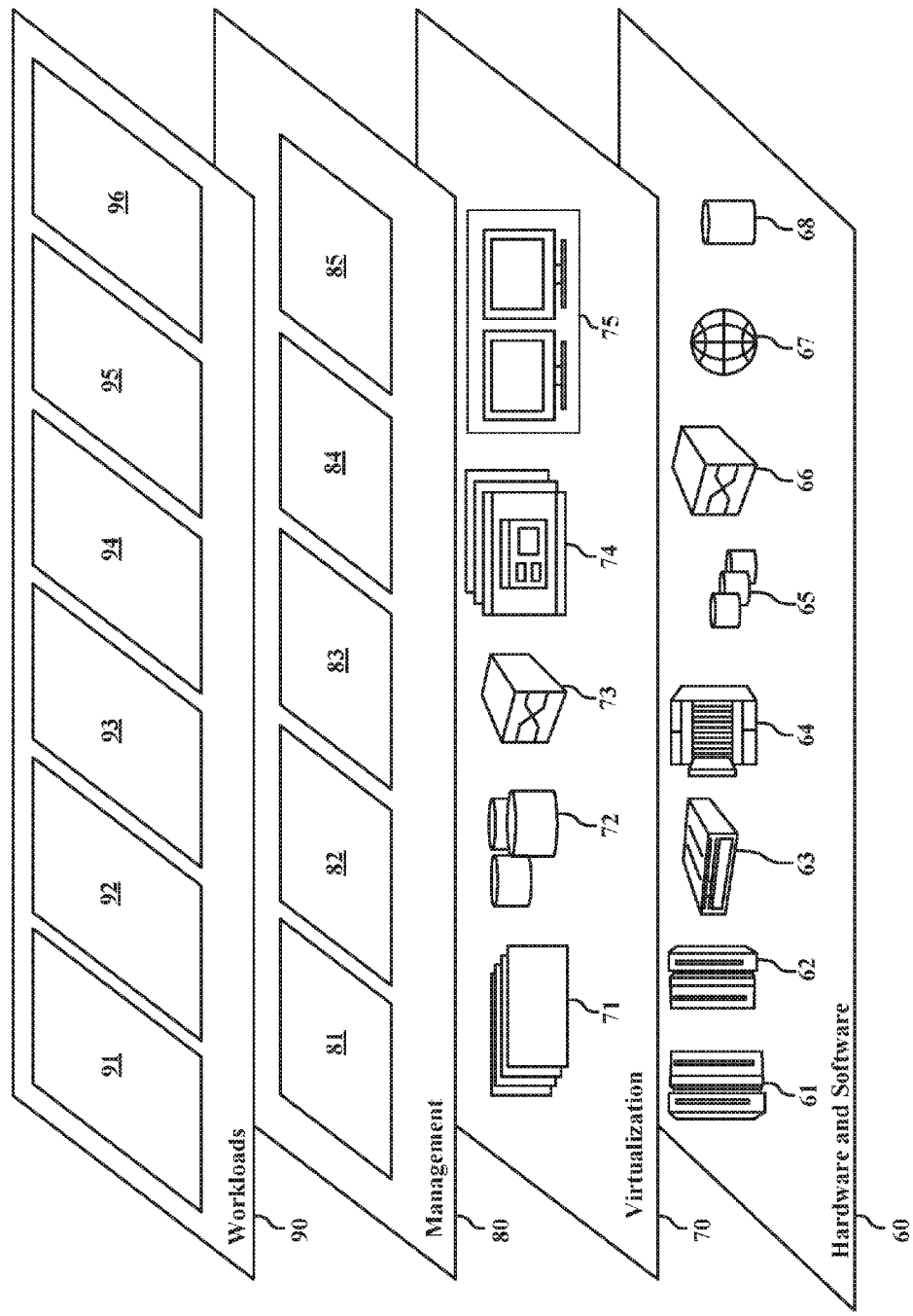
FIG. 11 depicts abstraction model layers according to an embodiment of the present invention.

Referring now to FIG. 11, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and geo-fenced volume 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a software defined network, comprising:
   a memory; and
   a processor in a wireless access point hardware security device in communication with the memory, the processor configured to perform a method comprising
      accessing a user profile for a device that includes one or more network permissions based on a geographic location of the device relative to a first geo-fenced volume of the software defined network,
         wherein the one or more network permissions includes access to resources within the first geo-fenced volume,
         wherein the user profile includes the geographic location of the device and security information of a user,
         wherein the security information includes at least one of a biometric identify marker scan and an authentication identifier of the user,
            wherein the biometric identity markers scan is selected from the group consisting of a retinal scan and a fingerprint scan, wherein the authentication identifier is selected from the group consisting of badge access and guarded entries,
reconfiguring the one or more network permissions based on the user profile of the device,
determining a first condition where the geographic location of the device is within the first geo-fenced volume,
granting the one or more network permissions in response to the first condition wherein the device is within the first geo-fenced volume, and
providing physical access to the user to a second geo-fenced volume of the software defined network through a point of access based on the security information, wherein the point of access includes a locked doorway.

2. The system of claim 1, wherein the method further comprises:
defining the second geo-fenced volume of the software defined network;
accessing the user profile for the device that includes the one or more network permissions further based on the geographic location of the device relative to the first geo-fenced volume and the second geo-fenced volume, wherein the one or more network permissions further includes access to resources within the second geo-fenced volume;
determining whether the geographic location of the device is within the second geo-fenced volume; and
granting the one or more network permissions in response to determining that the device is within the second geo-fenced volume.

3. The system of claim 2, wherein the second geo-fenced volume is contained within the first geo-fenced volume.

4. The system of claim 2, wherein the method further comprises:
defining the point of access to the second geo-fenced volume from the first geo-fenced volume;
securing the point of access from the first geo-fenced volume to the second geo-fenced volume to prevent the user from entering the second geo-fenced volume without authenticating the user to enter the second geofenced volume; and
granting an access permission to the device based on the user profile in response to the device being within the second geo-fenced volume.

5. A computer program product for managing a software defined network comprising a computer readable storage medium having program instructions embodied therewith, the program instructions executable by a processor in a wireless access point hardware security device to cause the processor to perform a method comprising:
accessing a user profile for a device that includes one or more network permissions based on a geographic location of the device relative to a first geo-fenced volume of the software defined network,
wherein the one or more network permissions includes access to resources within the first geo-fenced volume,
wherein the user profile includes the geographic location of the device and security information of a user,
wherein the security information includes at least one of a biometric identify marker scan and an authentication identifier of the user,
wherein the biometric identity markers scan is selected from the group consisting of a retinal scan and a fingerprint scan,
wherein the authentication identifier is selected from the group consisting of badge access and guarded entries;
reconfiguring the one or more network permissions based on the user profile of the device;
determining a first condition where the geographic location of the device is within the first geo-fenced volume;
granting the one or more network permissions in response to the first condition wherein the device is within the first geo-fenced volume; and
providing physical access to the user to a second geo-fenced volume of the software defined network through a point of access based on the security information, wherein the point of access includes a locked doorway.

6. The computer program product of claim 5, wherein the granting comprises:
accessing the security information of the user profile; and
determining an access path of the device using the security information of the user profile.

7. The computer program product of claim 6, wherein the granting further comprises authenticating the user by using the biometric identity marker scan of the user.

8. The computer program product of claim 6, wherein the granting further comprises authenticating the user by using the authentication identifier of the user.

9. The computer program product of claim 6, wherein the access path of the device includes service injections based on the security information.

* * * * *